United States Patent
Yoshioka et al.

(10) Patent No.: US 7,074,032 B2
(45) Date of Patent: Jul. 11, 2006

(54) INJECTION MECHANISM FOR INJECTION MOLDING MACHINE

(75) Inventors: Mitsushi Yoshioka, Yamanashi (JP); Koji Senda, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 208 days.

(21) Appl. No.: 10/861,067

(22) Filed: Jun. 4, 2004

(65) Prior Publication Data

US 2004/0265423 A1    Dec. 30, 2004

(30) Foreign Application Priority Data

Jun. 6, 2003    (JP)    ............... 2003-162612

(51) Int. Cl.
B29C 45/50    (2006.01)
(52) U.S. Cl. .................. 425/574; 425/587
(58) Field of Classification Search ............. 425/574, 425/582, 583, 587
See application file for complete search history.

(56) References Cited

U.S. PATENT DOCUMENTS

| | | | |
|---|---|---|---|
| 4,693,676 A * | 9/1987 | Inaba | 425/125 |
| 4,879,077 A * | 11/1989 | Shimizu et al. | 425/145 |
| 4,961,696 A * | 10/1990 | Yamamura | 425/149 |
| 5,421,712 A * | 6/1995 | Laing et al. | 425/145 |
| 5,955,117 A * | 9/1999 | Ito et al. | 425/145 |
| 6,059,556 A | 5/2000 | Koike et al. | |
| 6,641,388 B1 * | 11/2003 | Koide et al. | 425/574 |
| 6,793,477 B1 * | 9/2004 | Yoshioka | 425/574 |

FOREIGN PATENT DOCUMENTS

| | | |
|---|---|---|
| EP | 0 752 303 A1 | 1/1997 |
| EP | 1 136 220 A2 | 9/2001 |
| JP | 04 067922 | 3/1992 |
| JP | 06-079733 | 3/1994 |
| JP | 06 241228 | 8/1994 |
| JP | 8-192447 A | 7/1996 |
| JP | 2000 084987 | 3/2000 |
| JP | 2001-260196 | 9/2001 |

OTHER PUBLICATIONS

XP002295281, 2000-297348, Derwent Publications Ltd., London, Great Britain, (JP2000084987).
European Patent Office Search Report.

* cited by examiner

Primary Examiner—James P. Mackey
(74) Attorney, Agent, or Firm—Drinker Biddle & Reath LLP

(57) ABSTRACT

An injection mechanism for an injection molding machine includes a front plate carrying an injection cylinder. A guide rod is arranged fixedly relative to the front plate, and defines a longitudinal guiding axis. A movable plate is arranged movably relative to said front plate along said guiding axis, and carries an injection screw. A support structure is interposed between the guide rod and the movable plate, and movably supports the movable plate on the guide rod along the guiding axis. The support structure including a ball-engaging surface is provided on the guide rod and a ball-spline nut is provided in the movable plate. The ball-spline nut is engaged with the ball-engaging surface.

6 Claims, 3 Drawing Sheets

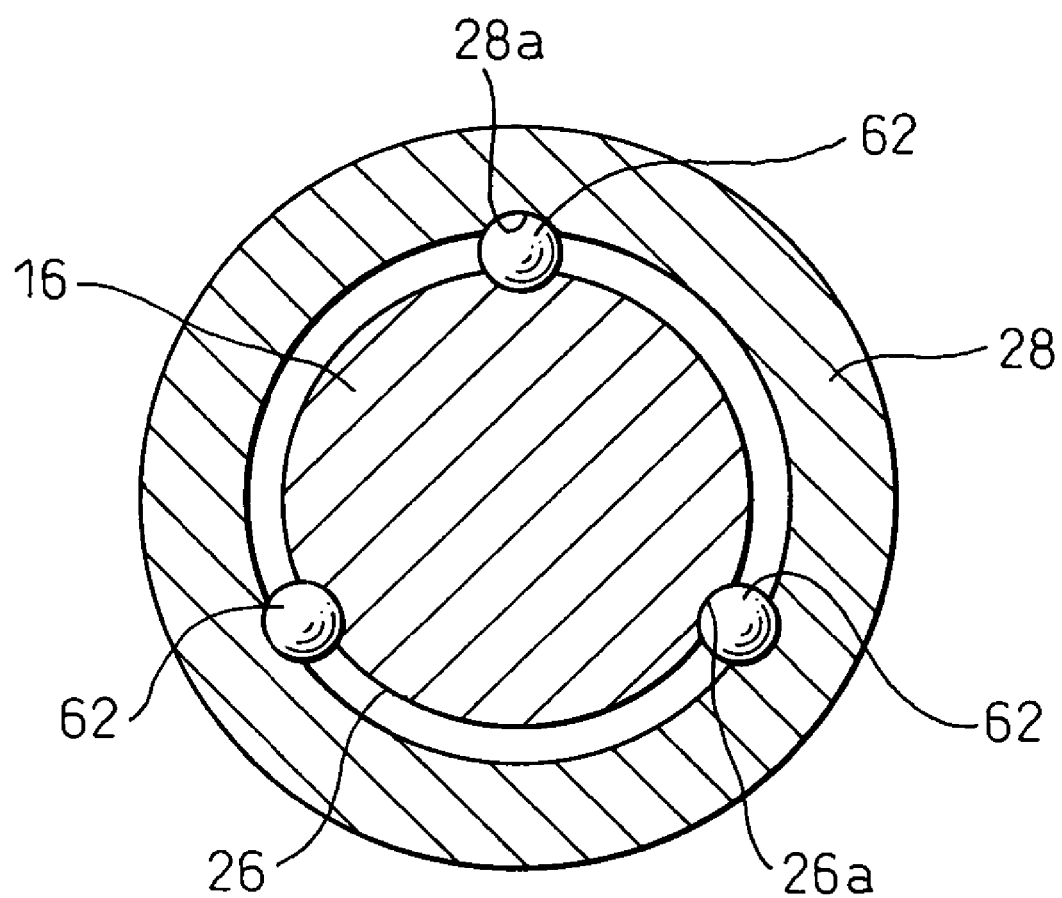

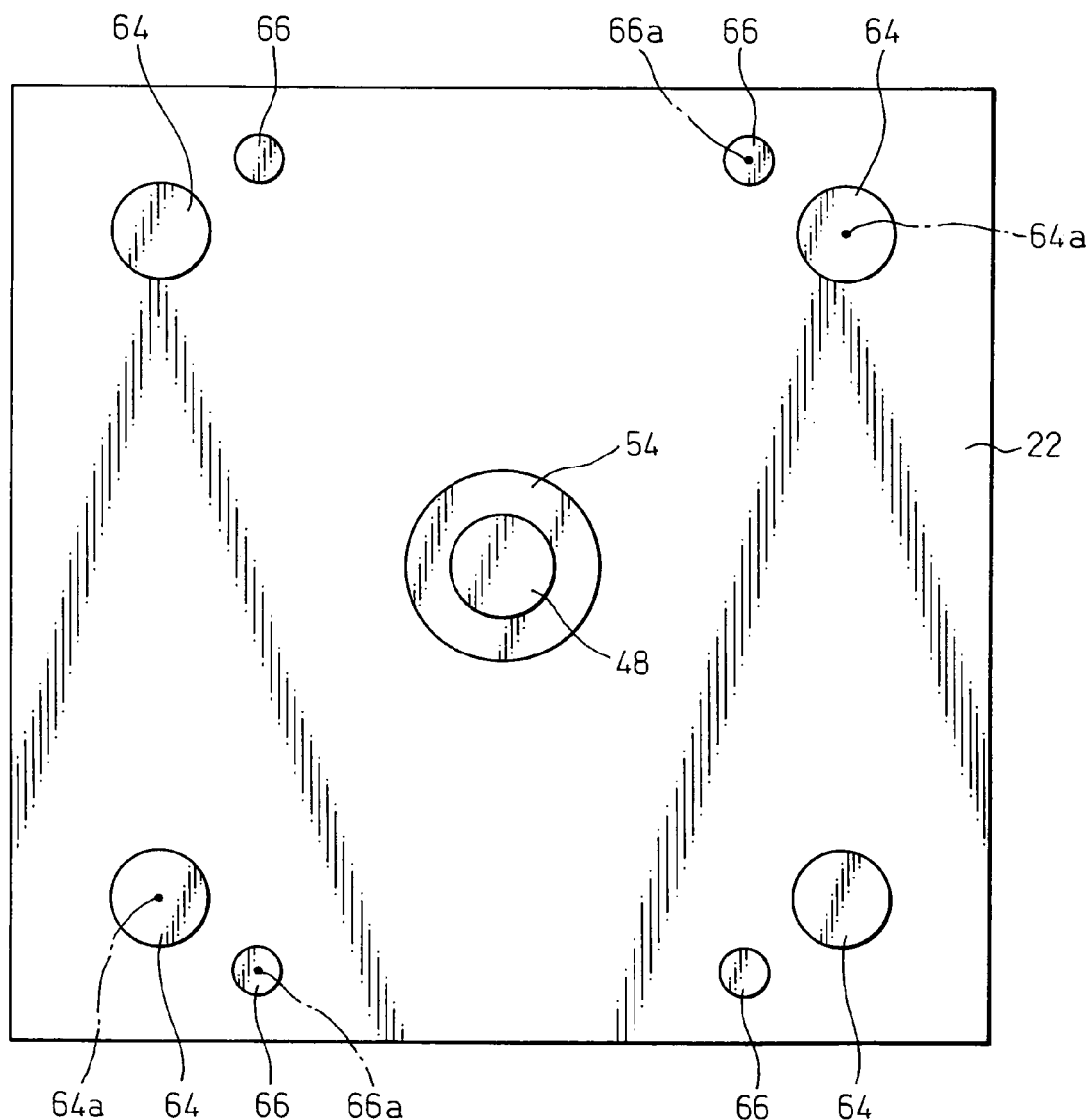

INJECTION MECHANISM FOR INJECTION MOLDING MACHINE

BACKGROUND OF THE INVENTION

1. Field of the Invention

The present invention relates to an injection mechanism for an injection molding machine.

2. Description of the Related Art

An injection molding mechanism for an injection molding machine is generally constructed in such a manner that a movable plate rotatably carrying an injection screw is slidably attached onto a guide rod arranged parallel to the rotation axis of the injection screw, and that the movable plate is driven by a drive section along the guide rod so as to axially move the injection screw, whereby an injection (or advancing) step, a metering (or backing) step, and so on, are performed.

For example, Japanese Unexamined Patent Publication (Kokai) No. 8-192447 (JP8-192447A) discloses an injection mechanism for an injection molding machine, which includes a front plate carrying an injection cylinder, a rear plate oppositely facing and spaced from the front plate and tied to the front plate through a plurality of tie rods, and a movable plate arranged between the front and rear plates and movable along the tie rods. The movable plate carries an injection screw in a rotatable but axially immovable manner, and, on the other hand, is slidably attached to the tie rods, acting as guide rods, through sliding bearing bushes provided in the movable plate. In this condition, the rotation axis of the injection screw is located generally parallel to the guiding axes of the tie rods. Also, a drive section for moving the movable plate along the tie rods is provided as an electric motor and a feed screw unit operated by the electric motor.

In the conventional injection mechanism as described above, the movable plate slides on the tie rods (or guide rods) through a sliding bearing mechanism in the rotation axis direction of the injection screw, in both of metering and injection steps. Therefore, a clearance is inevitably created between the inner circumferential surface of the sliding bearing bush and the outer circumferential surface of the tie rod, which results in a play between the sliding bearing bush and the tie rod. Therefore, there is a tendency that an eccentricity or an axis inclination is caused between the sliding bearing bush and the tie rod, when the movable plate moves forward or backward, which may generate a so-called stick-slip motion or increase a sliding frictional resistance, thereby an injection pressure in the injection step or a back pressure in the metering step may fluctuate, and consequently an injection process may become unstable. In particular, in the above-described arrangement in which the drive section for the movable plate includes the feed screw unit, there is a case where a reaction force against the rotation of a screw shaft in the feed screw unit is transmitted to the tie rods (or guide rods) through a ball nut in the feed screw unit, mounted on the rear plate and supporting the screw shaft. In this case, the eccentric mutual engagements between the tie rods and the sliding bearing bushes are likely to become significant, and, as a result, an injection operation and/or a metering operation may become further unstable.

SUMMARY OF THE INVENTION

It is an object of the present invention to provide an injection mechanism for an injection molding machine, in which a movable plate is able to be smoothly moved along a guide rod, so that the injection mechanism stably operates in both of injection and metering steps.

To accomplish the above object, the present invention provides an injection mechanism for an injection molding machine, comprising a front plate carrying an injection cylinder; a guide rod arranged fixedly relative to the front plate, and defining a longitudinal guiding axis; a movable plate arranged movably relative to the front plate along the guiding axis, and carrying an injection screw; and a support structure interposed between the guide rod and the movable plate, and movably supporting the movable plate on the guide rod along the guiding axis; the support structure including a ball-engaging surface provided on the guide rod and a ball-spline nut provided in the movable plate, the ball-spline nut being engaged with the ball-engaging surface.

The above injection mechanism may further comprise a rear plate arranged at a location opposite to the front plate with the movable plate disposed therebetween, and the guide rod may comprise a tie rod tying the front plate and the rear plate to each other.

Alternatively, the injection mechanism may further comprise a rear plate arranged at a location opposite to the front plate with the movable plate disposed therebetween, and a tie rod, separate from the guide rod, defining a second longitudinal guiding axis generally parallel to the guiding axis of the guide rod; the tie rod tying the front plate and the rear plate to each other.

Also, the injection screw may have a rotation axis generally parallel to the guiding axis and may be rotatably carried on the movable plate, and the plurality of guide rods may be arranged at regular intervals along a circumference having a predetermined radius about the rotation axis of the injection screw.

Also, the support structure may include a plurality of ball-spline nuts engaged with the ball-engaging surface of the guide rod.

Also, the injection mechanism may further comprise a drive section for moving the movable plate along the guiding axis, and the drive section may include an electric motor and a feed screw unit operated by the electric motor.

BRIEF DESCRIPTION OF THE DRAWINGS

The above and other objects, features and advantages of the present invention will become more apparent from the following description of preferred embodiments in connection with the accompanying drawings, wherein:

FIG. 2 is an illustration for explaining a ball-spline type support structure in the injection mechanism according to the present invention; and FIG. 3 is a front view showing a rear plate in an injection mechanism according to another embodiment of the present invention.

DETAILED DESCRIPTION

Figure 1:
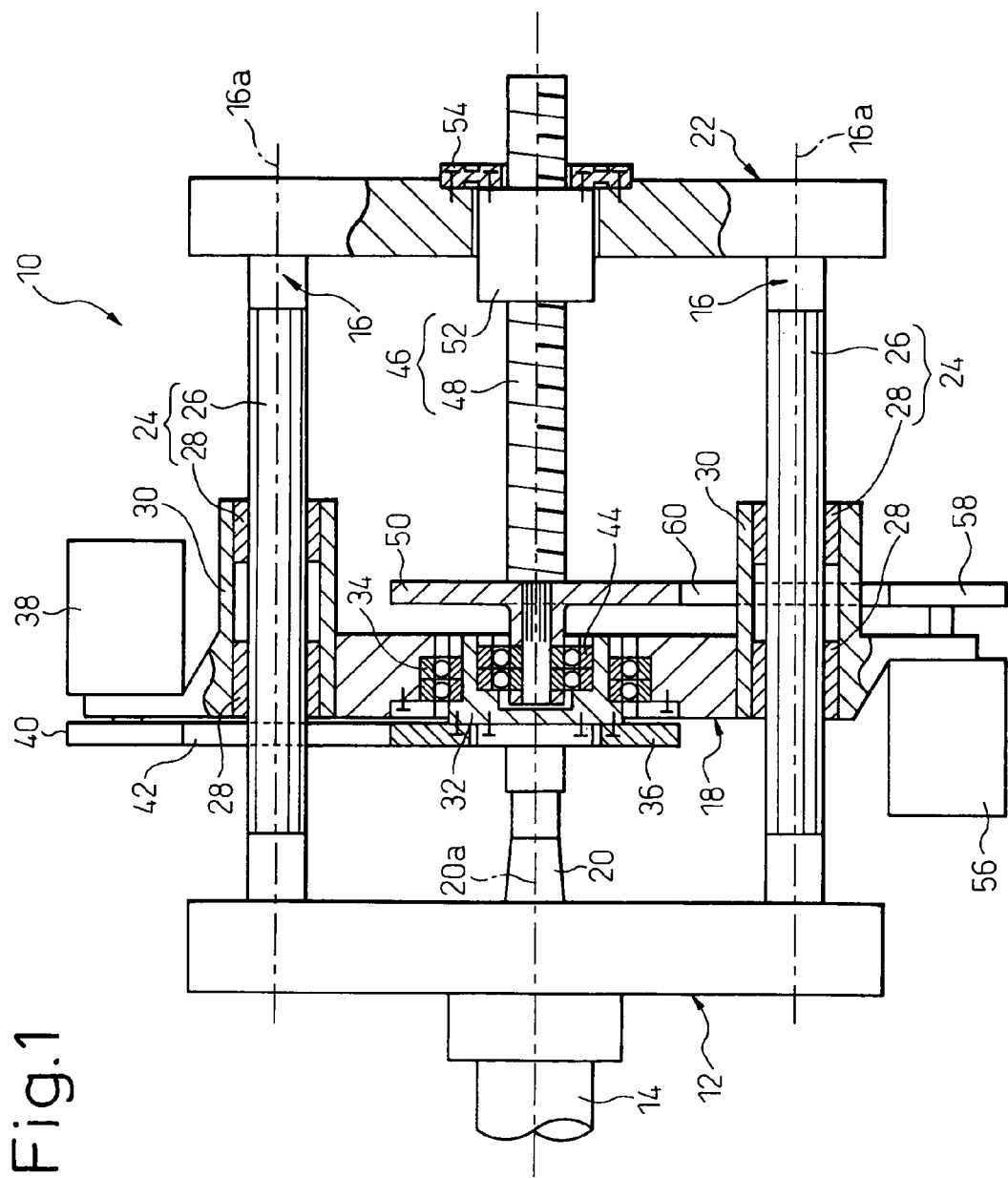
FIG. 1 is a partially cut-out front view schematically showing an injection mechanism according to an embodiment of the present invention.

The embodiments of the present invention are described below in detail, with reference to the accompanying drawings. In the drawings, the same or similar components are denoted by common reference numerals.

Referring to the drawings, FIG. 1 schematically shows an injection mechanism 10 according to one embodiment of the present invention. The injection mechanism 10 includes a front plate 12 carrying an injection cylinder 14; a guide rod 16 arranged fixedly relative to the front plate 12 and having a longitudinal guiding axis 16a; a movable plate 18 arranged movably relative to the front plate 12 along the guiding axis 16a and carrying an injection screw 20; a rear plate 22 arranged at a location opposite to the front plate 12 with the movable plate 18 disposed between the front and rear plates 12, 22; and a support structure 24 interposed between the guide rod 16 and the movable plate 18 and movably supporting the movable plate 18 on the guide rod 16 along the guiding axis 16a.

The guide rod 16 is structured as a tie rod 16 integrally tying the front plate 12 and the rear plate 22 to each other. In the illustrated embodiment, the mutually opposing surfaces of the front plate 12 and the rear plate 22 are of rectangular profiles, and four tie rods 16 are secured respectively to the four corners of the opposing surfaces (FIG. 1 illustrates only two tie rods 16).

Each tie rod 16 is provided with a ball-engaging surface 26 formed by plural ribs or grooves extending along the guiding axis 16a, at least over a desired length, over which the movable plate 18 moves along the tie rod 16. In other words, the tie rod 16 functions as a spline shaft over the length provided with the ball-engaging surface 26. On the other hand, the movable plate 18 is provided with a plurality of ball-spline nuts 28 operatively engaged (or spline-coupled) with the ball-engaging surfaces 26 of the respective tie rods 16. The ball-engaging surfaces 26 on the tie rods 16 and the corresponding ball-spline nuts 28 cooperate with each other to constitute the support structure 24 as described above.

In the illustrated embodiment, a pair of ball-spline nuts 40 is mounted, in association with one tie rod 16, on a nut support 30 provided at a predetermined location on the movable plate 18. The movable plate 18 is able to move along the tie rods 16 in the direction of guiding axes 16a through this ball-spline type support structure 24. The support structure 24 may be provided, in association with one tie rod (or guide rod) 16, with one or three and above ball-spline nut 28 engaged with the ball-engaging surface of one tie rod 16.

The movable plate 18 is provided at the center thereof with a through hole, and a screw sleeve 32, on which the injection screw 20 is mounted, is attached in the through hole in a rotatable but axially immovable manner through a bearing 34. The injection screw 20 is thus carried on the movable plate 18 in a rotatable but axially immovable manner, while the rotation axis 20a thereof is located generally parallel to the guiding axes 16a of the tie rods 16. Four tie rods 16 are arranged at regular intervals along a circumference having a predetermined radius about the rotation axis 20a of the injection screw 20.

An annular pulley 36 for rotating the screw is integrally secured to the axial front-end face (the left-end face, in the drawing) of the screw sleeve 32. An electric motor 38 for rotating the screw is securely mounted on a predetermined location in the outer peripheral edge of the movable plate 18. The electric motor 38 drives the screw sleeve 32 and the injection screw 20 for integral rotation, through a timing belt 42 rounded over and extending between a drive pulley 40 fixed to the output shaft of the motor 38 and the pulley 36 fixed to the screw sleeve 32.

A screw shaft 48 of a feed screw unit 46 is attached, at one end thereof, to the inner circumferential portion of the screw sleeve 32 in a rotatable but axially immovable manner through a bearing 44. A pulley 50 for injection driving is attached to the screw shaft 48. On the other hand, the rear plate 22 is provided at the center thereof with a through hole, and a ball nut 52 of the feed screw unit 46 is mounted in the through hole in such a manner as to be screwed on the screw shaft 48. The ball nut 52 is attached to a load cell 54 secured on the back side of the rear plate 22, and is disposed inside the through hole of the rear plate 22 through a clearance. The load cell 54 is able to detect a force (such as, an injection pressure) acting onto the ball nut 52 in the axial direction thereof.

An electric motor (preferably, a servo motor) 56 for injection driving is securely mounted on a predetermined location in the outer peripheral edge of the movable plate 18, at an area opposite to the electric motor 38 for rotating the screw. The electric motor 56 drives the screw shaft 48 for rotation, through a timing belt 60 wound over and extending between a drive pulley 58 fixed to the output shaft of the motor 56 and the pulley 50 fixed to the screw shaft 48. The feed screw unit 46 and the electric motor 56 constitute a drive section for moving the movable plate 18 along the guiding axes 16a of the tie rods 16.

The injection mechanism 10 having the above constitution operates as follows. In a metering step, the injection screw 20 is rotated by the operation of the electric motor 38, so as to melt and knead a resinous material and meter the molten material. During this step, the injection screw 20 tends to be pushed in an axial rearward (rightward, in FIG. 1) direction by the resinous material molten and fed toward the distal end of the screw and, thereby, the movable plate 18 and the screw shaft 48 are pushed backward. The screw shaft 48 moves backward due to the pushing force while rotating in a predetermined direction, since it is screwed with the ball nut 52 mounted on the rear plate 22. In this connection, it is possible to actuate the electric motor 38 to suitably drive the screw shaft 48 for rotation in the reverse direction, so that the backward motion of the screw shaft 48 and the movable plate 18 is adjusted and a back pressure is thus controlled.

In an injection step, the screw shaft 48 is rotated by the operation of the electric motor 56, so as to advance the screw shaft 48 and the movable plate 18 in an axial frontward (leftward, in FIG. 1) direction, through a screw engagement between the screw shaft 48 and the ball nut 52 mounted on the rear plate 22. Thereby, the injection screw 20 moves forward in the interior of the injection cylinder 14, so as to inject the molten resinous material.

In the metering and injection steps as described above, the movable plate 18 moves forward/backward through the axial guide of the plural tie rods 16. In this connection, each tie rod 16 functions as a spline shaft including the ball-engaging surface 26, at least over a desired length, over which the movable plate 18 moves along the tie rod 16, as already described, and thus the movable plate 18 moves on the tie rods 16 in the condition where the ball-engaging surfaces 26 thereof are engaged or spline-coupled with the corresponding ball-spline nuts 28 provided in the movable plate 18. Accordingly, in this moving range of the movable plate 18, the play between each tie rod 16 and the corresponding ball-spline nut 28 is eliminated, and it is possible to prevent the eccentricity and the axis inclination relative to each other (i.e., the rotation and tilting of the movable plate 18) from being caused, and thus to prevent the generation of the stick-slip motion and the increase of the sliding frictional resistance, which otherwise be resulted from the eccentricity and the axis inclination.

To more particularly describe the above function, referring to FIG. 2, a plurality of rigid balls 62 are interposed between the ball-engaging surface 26 formed on the tie rod 16 and the ball-spline nut 28 provided in the movable plate 18 (FIG. 1), so as to be rollingly engaged with both of plural (three, in the drawing) grooves 26a formed in the surface 26 and plural (three, in the drawing) grooves 28a formed on the nut 28. As a result, the play between the spline-shaft length of the tie rod 16 and the ball-spline nut 28 is eliminated so as to keep them in a predetermined positional correlation (usually, a coaxial condition), and also the relative rotation between the tie rod 16 and the ball-spline nut 28 is prevented. While maintaining the positional correlation, the ball-spline nut 28 moves on the spline-shaft length of the tie rod 16 through the rigid balls 62, and thus the movable plate 18 (FIG. 1), on which the ball-spline nut 28 is secured, moves along the tie rod 16 in the axial direction.

According to the above-described function of the ball-spline type support structure 24, even if, in both of the metering and injection steps as described above, a reaction force, generating when the screw shaft 48 is driven for rotation by the electric motor 56, is transmitted to the tie rods 16 through the ball nut 52 and the rear plate 22, the relative eccentric condition between each tie rod 16 and each ball-spline nut 28 is surely prevented by the rigid balls 62 engaged with the ball-engaging surface 26 on the tie rod 16. Therefore, in the injection mechanism 10, regardless of the provision of the feed screw unit 46 in the injection drive section, it is ensured that the eccentricity and the axis inclination of the respective ball-spline nuts 28 relative to the corresponding tie rods 16, and thus the generation of the stick-slip motion and the increase of the sliding frictional resistance, are effectively prevented, in comparison with a sliding-bearing type support structure between a tie rod and a movable plate in a conventional injection mechanism. Consequently, in the injection mechanism 10, it is possible to smoothly move the movable plate 16 in both of the metering and injection steps, so as to perform a stable injection process.

In the above-described embodiment, the ball-engaging surfaces 26 are formed respectively on the plural tie rods 16 tying the front plate 12 and the rear plate 22 to each other, so as to make the spline-shaft lengths of the tie rods 16 act as guide rods, whereby the movement of the movable plate 18 is guided. Alternatively, in another embodiment of the present invention, a ball-spline type support structure is formed by fixedly providing a guide rod, including a ball-engaging surface, between the front plate 12 and the rear plate 22, as a member separate from a tie rod tying the front and rear plates 12, 22, and also providing a ball-spline nut, operatively engaged with the ball-engaging surface of this guide rod, in the movable plate 18.

More specifically, as shown in FIG. 3, four guide rods 64 respectively including ball-engaging surfaces (or spline-shaft lengths) are arranged at locations corresponding to the four corners of the rectangular rear plate 22. Also, four tie rods 66 are provided between the front plate 12 (FIG. 1) and the rear plate 22 at locations near the respective guide rods 64. Each guide rod 64 defines a longitudinal guiding axis 64a for guiding the movable plate 18 (FIG. 1), and each tie rod 66 defines a second longitudinal guiding axis 66a generally parallel to the guiding axis 64a. In this arrangement, each tie rod 66 may include a cylindrical outer circumferential surface over the entire length thereof. Also, the movable plate 18 may be provided with a ball-spline nut engaged with the guide rod 64 and, separately from the ball-spline nut, a sliding bearing bush slidably receiving the tie rod 66.

As will be understood from the above, in the injection mechanism according to the present invention, the ball-engaging surface, constituting the ball-spline type support structure, may be provided on the tie rod in itself, or may be provided on the guide rod separate from the tie rod. Also, only one guide rod including the ball-engaging surface may be provided, and a desired number of ball-spline nuts engaged only with this guide rod may be provided in the movable plate. In this arrangement, the other tie rod (or guide rod) tying the front plate to the rear plate may be received in a sliding bearing bush provided in the movable plate, so as to guide the movement of the movable plate. According to these configurations, the rotation or tilting motion of the movable plate is surely prevented by the ball-spline type support structure, and thus the generation of the stick-slip motion is surely prevented.

It should be noted that, from the viewpoint of balancing properties, it is desirable that two or more guide rods, including ball-engaging surfaces, are provided, and that the guide rods are arranged at regular intervals along a circumference having a predetermined radius about the rotation axis of the injection screw. In this configuration and, for example, in the embodiment shown in FIG. 1, it is possible to provide the ball-engaging surfaces 26 for only two tie rods 16 arranged at positions symmetrical about the rotation axis 20a of the injection screw 20, so as to spline-couple these two tie rods 16 to the ball-spline nuts 28 provided in the movable plate 18, instead of providing the ball-engaging surfaces 26 for all of four tie rods 16 arranged at regular intervals. In this arrangement, the conventional sliding-bearing type support structure may be provided between other tie rods 16 and the movable plate 18. Alternatively, the movable plate 18 may be guided only by the ball-spline type support structure 24, without engaging the other tie rods 16 with movable plate 18 (i.e., without providing any guide function for the other tie rods 16).

While the invention has been described with reference to specific preferred embodiments, it will be understood by those skilled in the art that various changes and modifications may be made thereto without departing from the spirit and scope of the following claims.

The invention claimed is:

1. An injection mechanism for an injection molding machine, comprising:
    a front plate carrying an injection cylinder;
    a guide rod arranged fixedly relative to said front plate, and defining a longitudinal guiding axis;
    a movable plate arranged movably relative to said front plate along said guiding axis, and carrying an injection screw; and
    a support structure interposed between said guide rod and said movable plate, and movably supporting said movable plate on said guide rod along said guiding axis;
    wherein said support structure including a ball-engaging surface provided on said guide rod and a ball-spline nut provided in said movable plate, said ball-spline nut being engaged with said ball-engaging surface.

2. The injection mechanism for an injection molding machine, as set forth in claim 1, further comprising a rear plate arranged at a location opposite to said front plate with said movable plate disposed therebetween, wherein said guide rod comprises a tie rod tying said front plate and said rear plate to each other.

3. The injection mechanism for an injection molding machine, as set forth in claim 1, further comprising a rear plate arranged at a location opposite to said front plate with said movable plate disposed therebetween, and a tie rod, separate from said guide rod, defining a second longitudinal guiding axis generally parallel to said guiding axis of said guide rod; said tie rod tying said front plate and said rear plate to each other.

4. The injection mechanism for an injection molding machine, as set forth in claim 1, wherein said injection screw has a rotation axis generally parallel to said guiding axis and is rotatably carried on said movable plate, and wherein said plurality of guide rods are arranged at regular intervals along a circumference having a predetermined radius about said rotation axis of said injection screw.

5. The injection mechanism for an injection molding machine, as set forth in claim 1, wherein said support structure includes a plurality of ball-spline nuts engaged with said ball-engaging surface of said guide rod.

6. The injection mechanism for an injection molding machine, as set forth in claim 1, further comprising a drive section for moving said movable plate along said guiding axis, wherein said drive section includes an electric motor and a feed screw unit operated by said electric motor.

* * * * *